United States Patent [19]

Hulin

[11] 4,309,864
[45] Jan. 12, 1982

[54] APPARATUS FOR PRODUCING CABLE ELEMENTS INCORPORATING OTPICAL FIBERS

[75] Inventor: Jean P. Hulin, Conflans Ste Honorine, France

[73] Assignee: Lignes Telegraphiques et Telephoniques, France

[21] Appl. No.: 148,689

[22] Filed: May 12, 1980

[30] Foreign Application Priority Data

May 30, 1979 [FR] France .................. 79 13754

[51] Int. Cl.³ .................. D07B 5/00; D01H 13/04
[52] U.S. Cl. .................. 57/6; 57/352
[58] Field of Search .................. 57/3, 6, 9, 13, 17, 57/18, 249, 352, 361; 350/96.23

[56] References Cited

U.S. PATENT DOCUMENTS

| | | | |
|---|---|---|---|
| 4,154,049 | 5/1979 | King et al. .................. | 57/9 |
| 4,156,624 | 5/1979 | Vecchis et al. .................. | 57/13 X |
| 4,195,468 | 4/1980 | King et al. .................. | 57/9 |
| 4,205,899 | 6/1980 | King et al. .................. | 350/96.23 |
| 4,237,687 | 12/1980 | Vecchis et al. .................. | 57/13 X |

*Primary Examiner*—Donald Watkins

[57] ABSTRACT

A head for laying optical fibers in the grooves of a cylindrical support is fixed to a plate carrying fiber reserves by means of a coupling permitting rotation. The support is maintained at a temperature above ambient temperature up to the laying head.

2 Claims, 3 Drawing Figures

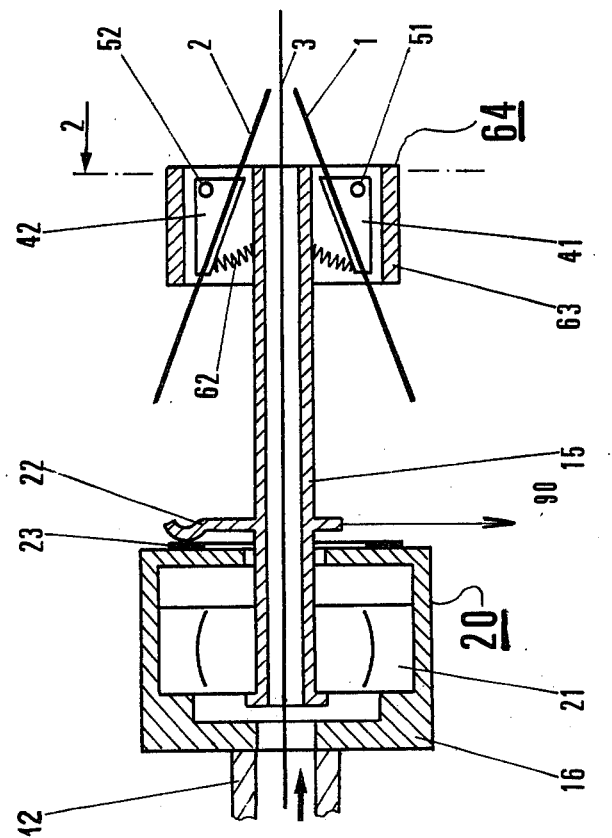
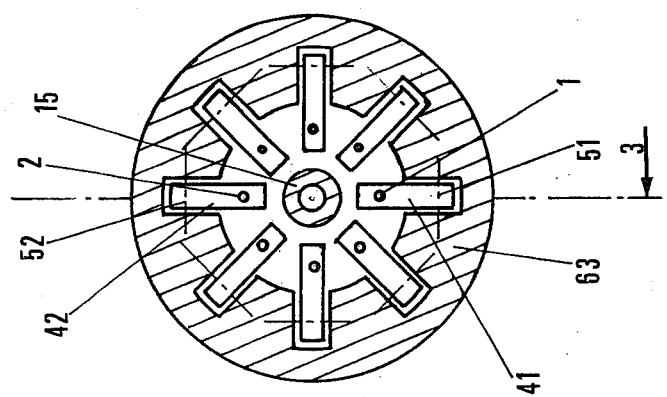
Fig. 3
Fig. 2

APPARATUS FOR PRODUCING CABLE ELEMENTS INCORPORATING OTPICAL FIBERS

BACKGROUND OF THE INVENTION

The invention relates to the production of cable elements, incorporating a rigid core surrounded by a covering dielectric having helical grooves with a simple or alternating pitch, whereby optical fibers are freely placed in these grooves. The invention more particularly relates to an apparatus for placing the optical fibers in the grooves.

The simultaneous placing of an optical fiber in each of the grooves of a generally cylindrical structure of the type referred to hereinbefore and as described more particularly in French Pat. No. 2,358,666 filed by LIGNES TELEGRAPHIQUES ET TELEPHONIQUES ON DEC. 30, 1975 and French Patent Application published under No. 2,381,326 and filed by LIGNES TELEGRAPHIQUES ET TELEPHONIQUES on Feb. 18, 1977, is ensured by means of elements constituting guides for optical fibres. These guides are elastic capillaries and by a tapered end rest on the bottom of each groove. They are maintained engaged by a light mounting support and are rotated without friction by the grooved structure, said guides forming an angle of less than 45° with the movement direction. In certain productions, laying is brought about by tools fixed to a rotary core. In others, the grooved structure is translated and the laying station rotates. The use of elastic guides which penetrate the groove permit an effective guidance of the fiber without tension. The absence of friction between the guide mounting and a fixed support makes it possible for the mounting assembly of the guides and to follow any rotations of the support and irregularities in the grooves without straining the fibers, making it possible to carry out the laying operation under industrial conditions. The elasticity of the guides also makes it possible to use one and the same tool for different structures of very similar dimensions and reduce the dimensional accuracy imposed during the manufacture of the grooved structure to a value which is compatible with industrial production.

French Patent Application No. 78-05833 (publication No. 2,418,940) in the name of LIGNES TELEGRAPHIQUES ET TELEPHONIQUES, particularly FIG. 7, describes a laying head, whose position relative to the cable support is dependent on an optical device incorporating a light source cooperating with a sensor via an optical guide traversing the laying head. The head is supported by a fixed frame via the coupling which permits rotation.

BRIEF SUMMARY OF THE INVENTION

The present invention essentially relates to an assembly variant of the laying head making it possible to control the rotation of a plate carrying fiber reserves from the head by mechanically connecting the head to the plate by a coupling permitting a relative rotation.

The main advantage of the invention is that the plate carrying the fiber reserves and the laying head constitute a mechanical assembly, whose rotation is controlled by the grooves of the cable support via elastic fiber guides which penetrate the same. This permits a better adaptation of the position of the head relative to the support, bearing in mind possible fluctuations in the pitch of the grooves with respect to the nominal value.

Thus, in the construction of French Patent Application No. 78-05833, the head rotates at the speed defined by the pitch of the groove (helical or alternating pitch) with respect to its mounting support. In the construction according to the present invention, as the head is integral with the plate, only the rotational speed variations resulting from pitch variations have to be compensated by rotating the head.

Another advantage of the construction according to the invention is that it becomes possible to define the temperature of the cable support at the point of laying with a greater precision. The difference in the expansions of the support and fibers can then be used for distributing along the cable an excess of fiber length relative to the support, which increases the lack of sensitivity of the cable to deformations to which it can be exposed, particularly during storage on a drum or during laying.

The invention also leads to the following advantages.

The freedom of displacement of the laying head is ensured by a bearing positioned between a shaft and a plate. Thus, frictional actions are substantially constant and make it possible to obtain a mounting of the fiber guides facilitating manipulations thereof. In particular, the dimensions of the mounting can be increased without influence on the frictional actions between the capillaries and the grooves. This makes it possible to use larger fiber guides, which reduces the danger of the fiber being damaged. It is also possible to associate auxiliary members with the guides facilitating the introduction and improving the guidance of the fibers.

The fiber guide mounting support is free from any supporting member and accessibility to the guides is increased, which improves the operating conditions for the machine.

BRIEF DESCRIPTION OF THE DRAWINGS

The invention is described in greater detail hereinafter relative to non-limitative embodiments and the attached drawings, wherein show:

FIG. 2 an elevation of the laying head.

FIG. 3 a longitudinal sectional view of the laying head and its support.

DETAILED DESCRIPTION OF THE PREFERRED EMBODIMENTS

Figure 1:
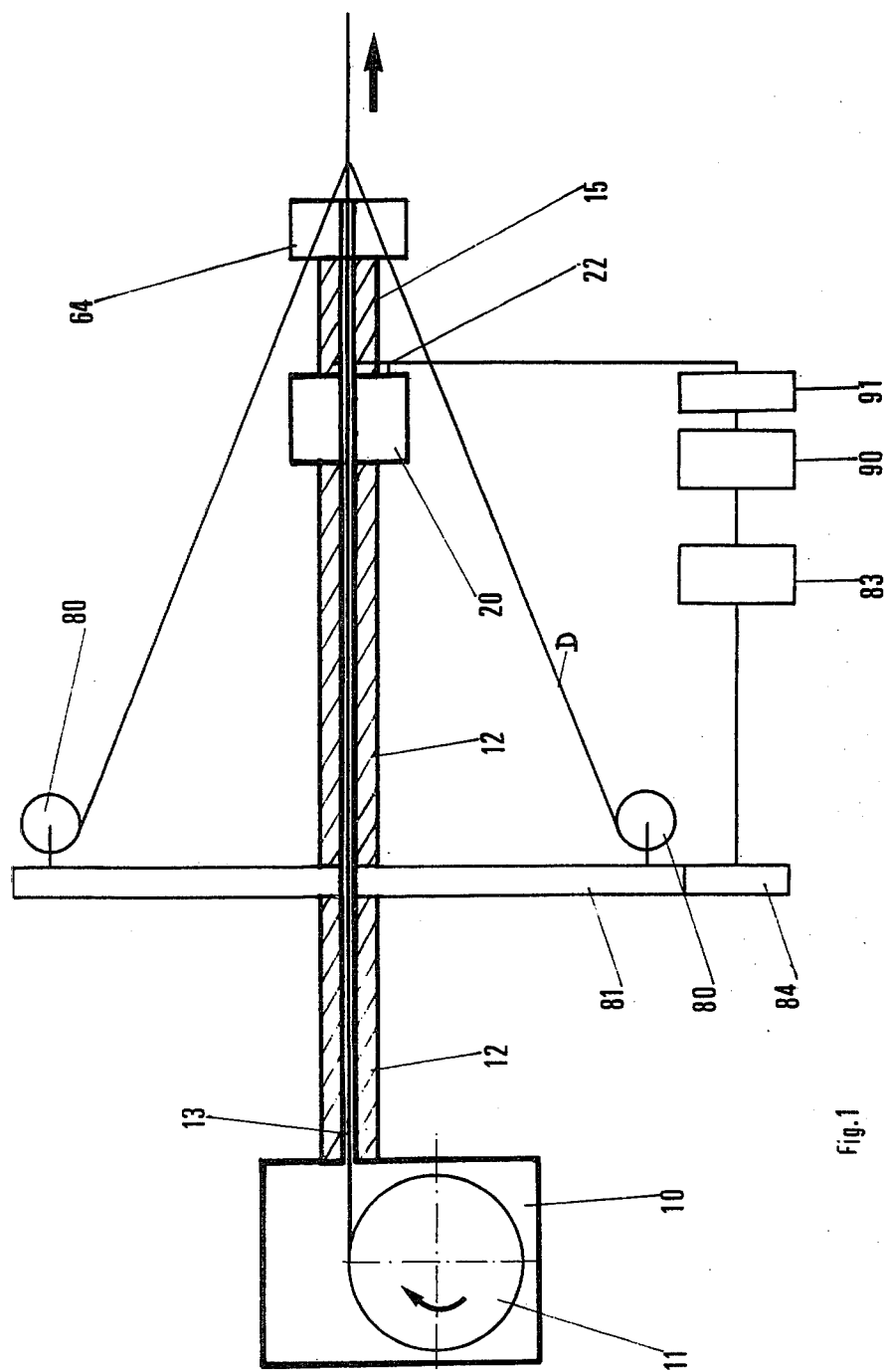
FIG. 1 a diagram of the fiber laying station using the apparatus according to the invention.

FIG. 1 shows at 81 a plate supporting reserves or stocks 80 of fibers D, supplying the fiber guides of a laying head 64. Means 84 rotates plate 81 via a motor 83. At 15 there is a shaft fixed to head 64 and a coupling device 20 permitting the shaft 15 to rotate relative to a rigid pipe 12 fixed to plate 81. A cable support 13 on which are placed the optical fibers from reserves 80 is supplied by a reserve 11 arranged within a heated enclosure 10 extending up to the plate 81 by the thermally insulated pipe 12. Support 13 and pipe 12 traverse plate 81. The coupling device 20 which permits rotation and shaft 15 are also thermally insulated up to the laying head 64. At 22 is diagrammatically shown a sensor which is sensitive to the rotation between assembly 15 and 64 and coupling device 20. This sensor defines both the relative rotational speed and the angular position of 64 relative to a reference position and fixed to plate 81. These indications are used in the two control devices of motor 83, shown respectively at 90 and 91 making it possible to control the rotational speed of plate 81 and the angular position of plate 81 relative to 64.

FIGS. 2 and 3 show a special embodiment of the assembly constituted by head 64, its coupling device 20 and sensor 22.

FIG. 2 shows in elevation a laying head identical to that shown in FIGS. 5 and 6 of French Patent Application No. 78-05833.

Each of the fiber guides 1, 2 is fixed to a parallelepipedic mounting support 41, 42. These mounting supports are regularly distributed about a hollow cylinder 15 which serves as a guide for the optical fiber support. These mounting supports are fixed by a shaft 51, 52, etc to a fixed frame, making it possible to independently define the slope of each of the fiber guides on the axis of the central opening of cylinder 15. A return spring 61, 62, etc creates the counter-torque necessary for the return of the associated mounting support into position when the latter is pivoted around its fixed shaft 51, 52, etc under the action for example of a thrust exerted on the end of the fiber guide. The individual mounting supports 41, 42, etc are fitted in a ring 63 carrying on its inner face the recesses for receiving the said mounting supports.

Ring 63 is fixed to cylinder 15 associated with the coupling device 20 incorporating a needle bearing 21 or any other device permitting the rotation of assembly 64-15 in coupling device 20. The latter is fixed to pipe 20, which is itself fixed to plate 81 of FIG. 1.

Sensor 22 is shown in the form of a sliding contact fixed to the hollow cylinder 15 and moving on a conductive path 23 deposited on that part of the coupling device 20 which is fixed to plate 81 by pipe 12. A not shown power supply makes it possible to obtain a voltage for controlling the control circuits 90 and 91 between sliding contact 22 and earth. For example, path 23 can be constituted by a ring interrupted in accordance with a radius serving to define a starting point for the marking of the relative angular positions of the sliding contact, i.e. plate 81 relative to laying head 64. Obviously, this example is given for illustrative purposes and numerous known devices make it possible to obtain the desired angular marking.

What is claimed is:

1. An apparatus for producing cable elements incorporating optical fibers and ensuring the simultaneous laying of a plurality of optical fibers in a plurality of helical grooves having a simple or alternating pitch, of a cylindrical support, said apparatus comprising a laying head wherein is machined an opening for said support travelling continuously through said laying head, said laying head further comprising a system of fiber guides constituted by hollow elastic metal tubes terminated at one of their ends by a bevel and resting inclined under pressure on the bottom of said grooves, said apparatus further comprising a plate carrying fiber stocks, means for rotating said plate at a speed corresponding to the theoretical value of the pitch of said grooves, and a coupling device for fixing said head on said plate while permitting a relative rotation of the head and the plate.

2. An apparatus according to claim 3, further comprising means for heating said support to a temperature in excess of ambient temperature, and a thermally insulated pipe surrounding said support when travelling through said apparatus.

* * * * *